United States Patent [19]

Kato et al.

[11] 4,161,005
[45] Jul. 10, 1979

[54] MAGNETIC HEADS AND FIXING MATERIAL WITH AN ADDITIONAL FILLER OF MOS₂

[75] Inventors: Hiroaki Kato, Machida; Junji Hamana, Chichibu, both of Japan

[73] Assignee: Canon Kabushiki Kaisha, Tokyo, Japan

[21] Appl. No.: 845,637

[22] Filed: Oct. 26, 1977

[30] Foreign Application Priority Data

Nov. 1, 1976 [JP] Japan .................................. 51-131507
Feb. 21, 1977 [JP] Japan .................................. 52-17900

[51] Int. Cl.² .......................................... G11B 5/105
[52] U.S. Cl. .................................................. 360/129
[58] Field of Search ................................. 360/129, 122

[56] References Cited

U.S. PATENT DOCUMENTS 3,495,048  2/1970  Gooch ................................... 360/129
3,586,788  6/1971  Page ...................................... 360/129

Primary Examiner—Robert S. Tupper
Attorney, Agent, or Firm—Fitzpatrick, Cella, Harper & Scinto

[57] ABSTRACT

A magnetic head comprises a magnetic core having a sliding surface on which a magnetic tape moves sliding, a casing for enclosing said magnetic core, and a fixing material used to secure said magnetic core within said casing, said fixing material essentially consisting of a resin, a filler and $MoS_2$ added as an additional filler.

9 Claims, 9 Drawing Figures

MAGNETIC HEADS AND FIXING MATERIAL WITH AN ADDITIONAL FILLER OF MOS₂

BACKGROUND OF THE INVENTION

1. Field of the Invention

The present invention relates to a magnetic head of the type which comprises a magnetic core, a casing for enclosing the core and a fixing material used to secure the core within the casing.

More particularly, the present invention relates to an improvement in such type of magnetic head by adding filler(s) to the fixing material so as to uniformize the abrasion of the tape sliding surface and thereby to lengthen the lifetime of the head.

2. Description of the Prior Art

During the use of a magnetic head over an extended period of time, the tape sliding surface thereof is gradually abraded by the friction between the surface and a magnetic tape sliding on it. At an early stage in the abrasion, the magnetic head begins to deteriorate in its recording characteristic at the high frequency band. At a further advanced stage in the abrasion, the deterioration in the recording characteristic spreads over the whole range of full frequency band.

Conventionally, permalloy is mainly used as the core material for a magnetic head. To solve the problem of the above-mentioned abrasion, there also have been developed magnetic heads in which a core made of material of higher abrasion resistance such as hard permalloy, ferrite, sendust or the like is used. However, the surface of a magnetic head on which a magnetic tape slides is formed not only by the core material but also by the fixing material injected into the magnetic head to secure the core within the casing. Therefore, to maintain the original characteristic or performance of a magnetic head, it is absolutely necessary to take into consideration the balance in abrasion between the core and the fixing material. Thus, a measure is required to equalize the abrasion on the core and that on the fixing material so that the tape sliding surface may always be kept flat. For this purpose, the fixing material used in a magnetic head is generally prepared by adding some amount of filler to resin.

A most common filler used for this purpose is $SiO_2$. By adding about 10–30% by weight of fine powder of $SiO_2$ based on the weight of the whole of the fixing material, the equalization of abrasion on both the core and the fixing material may be attained. But, such balancing of abrasion between the core material and the fixing material is not the sole factor depending upon which the kind and amount of filler to be used is determined. There are various other factors such as the displacement of the core within the change of temperature and humidity (caused by the expansion or shrinkage of the core and the fixing material), the injectability of fixing material, the adhesive property of the fixing material and the like. The use of $SiO_2$ fine powder less than 30% by weight based on the weight of the whole fixing material makes the magnetic head too sensitive to temperature and humidity. On the other hand, the use of more than 80% by weight based on the weight of the whole fixing material makes the injectability and adhesive property of the fixing material inadequately low. For these reasons, the amount of $SiO_2$ powder hitherto used for conventional magnetic heads is in the range of from 30 to 80 percent by weight.

It is also generally known that in addition to $SiO_2$(quartz), there may be used other filler material such as $Na_2O$—$CaO$—$SiO_2$(soda glass), $Mg_3[(OH)_2Si_4O_{10}]$ (talc), C(graphite), $Al_4(OH)_8Si_4O_{10}$ (kaolinite), $Ca(SO_4)2H_2O$(gypsum), $Al_2O_3$(alumina) and the like. However, it has been found impossible to obtain a good fixing material by merely mixing materials selected from the above mentioned group of filler materials by changing their contents in the fixing material. Thus, no combination thereof could produce a fixing material which was excellent in injectability and adhesive property and by which the trouble of core displacement occurring with the change of temperature and humidity could be minimized; and also a sufficiently uniform abrasion of the tape sliding surface sufficient to keep it flat could not be attained. With respect to the abrasion, it has been recognized that the conventional magnetic head, the fixing material of which contains 30 to 80% by weight of fine powder of $SiO_2$ can not be always maintained in the optimum condition.

During its use over a long period of time, the flat tape sliding surface of the magnetic head is changed into an uneven surface which in turn prevents a good contact between the magnetic tape and the magnetic core. Of course, this is caused by the fact that the abrasion of the core is larger than that of the fixing material. As a result, the electromagnetic transforming characteristic of the magnetic head is deteriorated due to a so-called spacing-loss in the range of high frequency at the beginning and further over the whole range of frequency later and thereby the output of the head is gradually reduced with the progress of the abrasion.

Moreover, in case of a cassette tape and similar tape recording apparatus, there is mounted in the cassette a tape pad by which the magnetic tape is brought into contact with the magnetic head under pressure. Therefore, the abrasion at the portion of magnetic core may reach a deep area of it and the irregularity of the tape sliding surface becomes extremely large with time. This will result in an undue undeterioration of the electromagnetic transforming characteristic before the magnetic core reaches its limit of abrasion.

Further, even if any suitable filler could be found as an effective additive to the fixing material, such filler usually would have the drawback that an increase in the amount to be added adversely affects the adhesive property and the insulating property of the resulting fixing material.

Therefore, a development of a good fixing material capable of satisfying all the requirements described above has been desired earnestly.

SUMMARY OF THE INVENTION

Accordingly, it is an object of the present invention to provide an improved magnetic head containing a fixing material injected thereinto, which enables equalization of the abrasion level of the magnetic core and that of the fixing material and thereby an increase in the lifetime of the magnetic head while maintaining a good electro-magnetic transforming characteristic thereof for a long time.

It is another object of the invention to provide an improved fixing material used in the magnetic head which is easy to inject into the magnetic head and has an improved adhesive property in respect to the magnetic core and the casing.

It is a further object of the invention to provide an improved magnetic head which is free from the adverse effects of expansion and shrinkage of the fixing material and the magnetic core occurring with change of temperature and humidity, preventing any trouble of deformation, displacement and cracking.

A still further object of the invention is to provide an improved magnetic head in which the magnetic core is well insulated from the casing and the like electrically and magnetically.

To attain the above objects according to the present invention, there is provided a magnetic head comprising a magnetic core having a sliding surface on which a magnetic tape slides, a casing for enclosing the magnetic core and a fixing material used to secure the magnetic head within the casing, said fixing material essentially consisting of a resin, a filler and $MoS_2$ as an additive.

The above and other objects and features of the present invention will appear more fully from the following description and claims taken in connection with the accompanying drawings.

DESCRIPTION OF THE PREFERRED EMBODIMENTS

Figure 1:
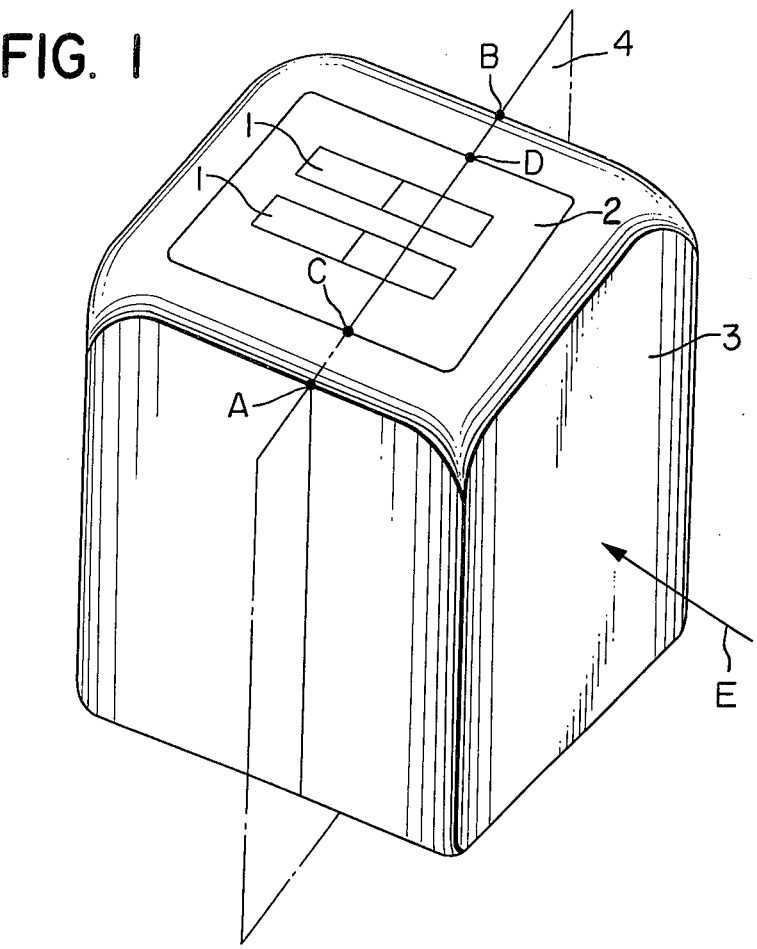
FIG. 1 is a perspective view of a magnetic head embodying the present invention, viewed from the side of the tape sliding surface of the magnetic head.

Referring now to FIG. 1, there is shown a magnetic head embodying the invention with its tape sliding surface facing up. The reference numeral 1 designates a magnetic core, 2 is a fixing material and 3 is a casing. If the magnetic head is cut away through the plane 4 indicated by a phantom line and the section is viewed in the direction of the arrow E after deforming the section at the rate of 50 (vertical):1 (horizontal), then a partial sectional view such as FIGS. 2A, 2B, 4A, 4B, 5, 6A and 6B will be obtained.

A and B designate the edge portions of the magnetic head on each side thereof respectively. The span between C and D is a surface area on which a magnetic tape (not shown) slides. During movement across the sliding surface, the magnetic tape comes in contact with the points C and D at its opposite edges in the direction of the width of the tape.

Figure 2A:
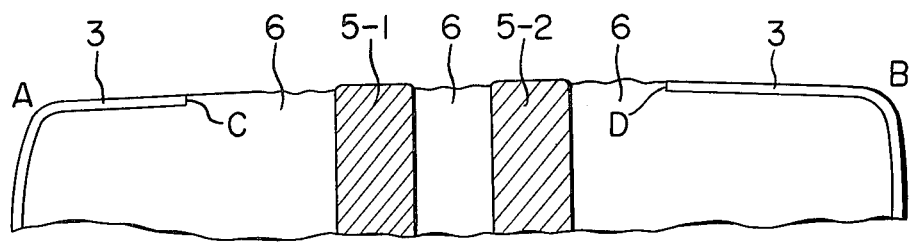
FIG. 2A is a partial sectional view of the first embodiment of the invention taken through the plane 4 in FIG. 1 showing the essential portion of the magnetic head deformed at the ratio of 50 (vertical direction):1 (horizontal direction) in the condition before conducting an abrasion test.

In the embodiment of FIG. 2A, there is used a magnetic core 5-1, 5-2 composed of a stack of eight(8) sheets of hard permalloy, each sheet being 0.2 mm thick. The fixing material 6 used in the embodiment is a material consisting of an epoxy resin, a fine powder of $SiO_2$ in an amount of 60% by weight based on the weight of the fixing material and $MoS_2$ added as an additional filler according to the invention in an amount of 10% by weight based on the weight of the fixing material. FIG. 2A shows in detail the profile of the essential portion including the tape sliding surface of the magnetic head, before conducting an abrasion test.

The magnetic head of the FIG. 2A embodiment was subjected to an abrasion test wherein a magnetic tape was driven on the tape sliding surface at the running speed of 4.75 cm/sec. for two hundreds(200) hours.

Figure 2B:
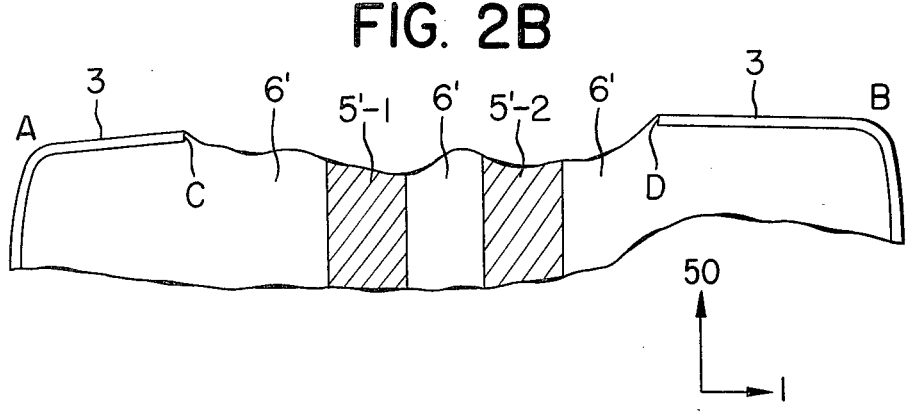
FIG. 2B is a view similar to FIG. 2A but showing the essential portion in the condition after the abrasion test.

FIG. 2B shows the profile of the essential portion after the abrasion test. In order to clearly illustrate the manner in which the sliding surface was abraded, the profile is magnified in the vertical direction by 50 times relative to the size measured in the horizontal direction as previously mentioned.

As a result of the abrasion test, the magnetic core 5-1, 5-2 shown in FIG. 2A was abraded into 5'-1, 5'-2 and the fixing material 6 into 6'. Here, it should be noted that the abrasion level of the fixing material 6' and that of the magnetic core 5'-1, 5'-2 are substantially equal.

Figure 3:
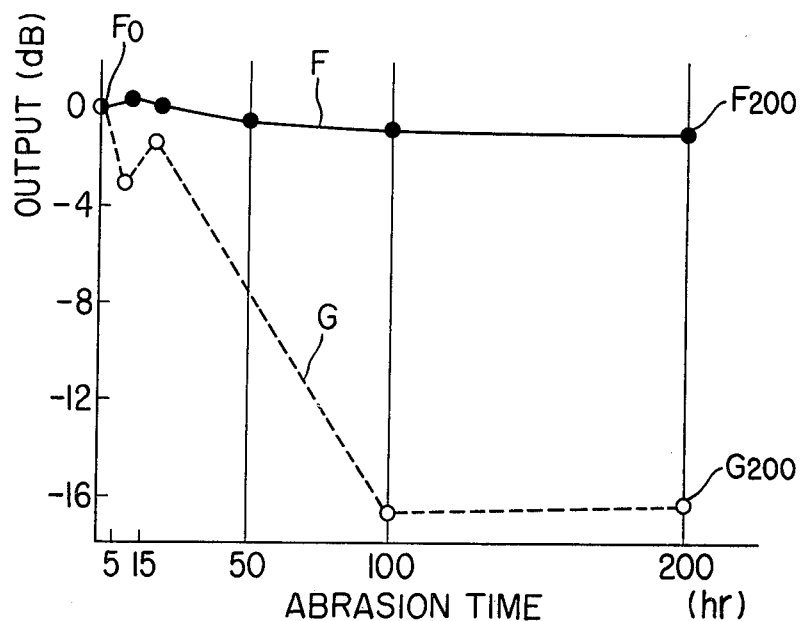
FIG. 3 shows abrasion time-output characteristic curves obtained using a magnetic head according to the invention and a conventional one respectively.

As will be seen from the curve F of FIG. 3 there is no remarkable difference between the output $F_o$ of the magnetic head according to the invention before the abrasion test and the output $F_{200}$ after the test. In contrast with this, the broken line curve G of FIG. 3 for the conventional magnetic head shows the fact that the output $F_o$ before the test was decreased to $G_{200}$ after the test which is 16dB lower than $F_o$.

Figure 4A:
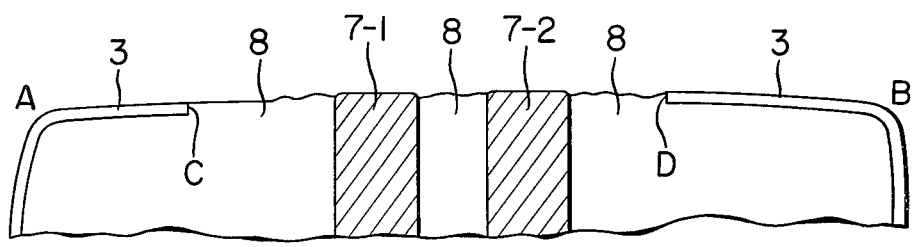
FIG. 4A is a view similar to FIG. 2A but showing the second embodiment of the invention.

In the embodiment of FIG. 4A, there is used a magnetic core 7-1, 7-2 made from a single sheet of sendust 0.6 mm thick. The fixing material used in the embodiment is a material consisting of an epoxy resin, a fine powder of $SiO_2$ in the amount of 60% by weight based on the weight of the fixing material and an additive, $MoS_2$ in the amount of 5% by weight based on the weight of fixing material.

Figure 4B:
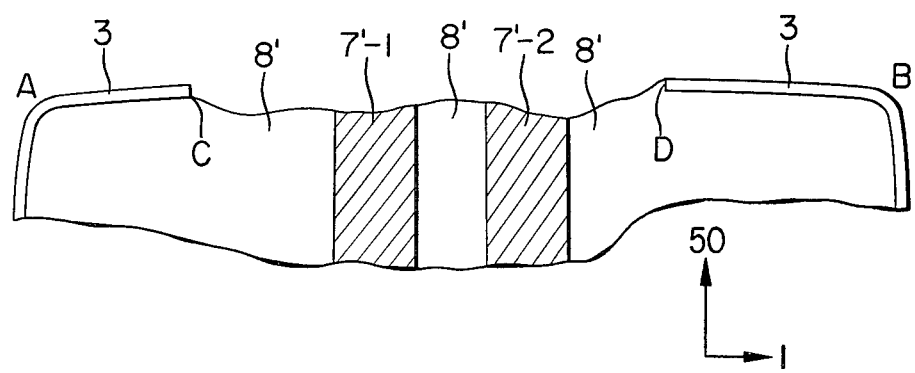
FIG. 4B is a view similar to FIG. 2B but showing the second embodiment.

The profile of the essential portion of the magnetic head before an abrasion test is shown in FIG. 4A and the corresponding profile thereof after the test is shown in FIG. 4B. The tape running speed used in the abrasion test was 4.75 cm/sec. and the running time was 300 hours. FIG. 4B shows the magnetic core 7'-1, 7'-2 and the fixing material 8' almost uniformly abraded by the abrasion test. As to the output, this embodiment also brought forth a good result approximately equal to the curve F shown in FIG. 3 and there was found no remarkable difference between the output before the test and that after it.

The optimum amount of $MoS_2$ to be added varies depending upon the kind of core material used as seen from the two embodiments described above. It is not preferable to use it in an amount more than about 50% by weight based on the weight of the fixing material because the abrasion loss of the resulting fixing material becomes too great compared with that of common core materials and moreover a deterioration in adhesive and insulating properties of the fixing material is caused by it. This disadvantage can be obviated by the third embodiment of the invention shown in FIGS. 5, 6A and 6B.

Figure 5:
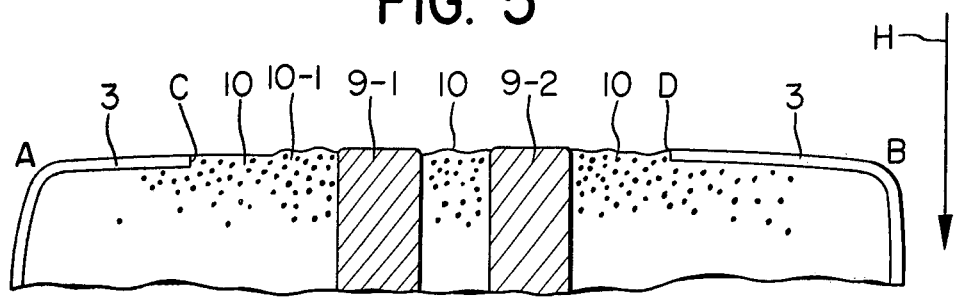
FIG. 5 is a partial sectional view of the third embodiment of the invention taken through the plane 4 in FIG. 1.

In FIG. 5, a magnetic core 9-1, 9-2 is bonded to and secured within a casing 3 by a fixing material 10 injected into the casing 3. The fixing material 10 is a material prepared by adding a fine powder of $SiO_2$ and a fine powder of $MoS_2$ to an epoxy resin. When $SiO_2$ in an amount of 40 to 80% by weight based on the weight of the fixing material and $MoS_2$ in an amount of 0.5 to 50% by weight based on the weight of the fixing material are added to the resin, the resulting fixing material exhibits a very good abrasion property. Further, the epoxy resin is preferably in an amount of at least 19.5% by weight based on the weight of the fixing material. However, considering the adhesive and insulating properties of the resulting fixing material, it is desirable to further reduce the amount of $MoS_2$ to be added. Therefore, to meet the requirements, according to the embodiment of FIG. 5, the density of the filler 10-1 contained in the fixing material is gradually decreased substantially to 0% in the direction of arrow H so as to improve the adhesive and insulating properties of the fixing material while maintaining its good abrasion property in the vicinity of the tape sliding surface extending between C and D. Such concentration gradient of the filler 10-1 dispersed in the fixing material 10 may be achieved by making gravity (or a centrifugal force) act on the fixing material in a direction contrary to that of the arrow H immediately after the injection and making use of the difference in specific gravity between the resin and the filler.

Figure 6A:
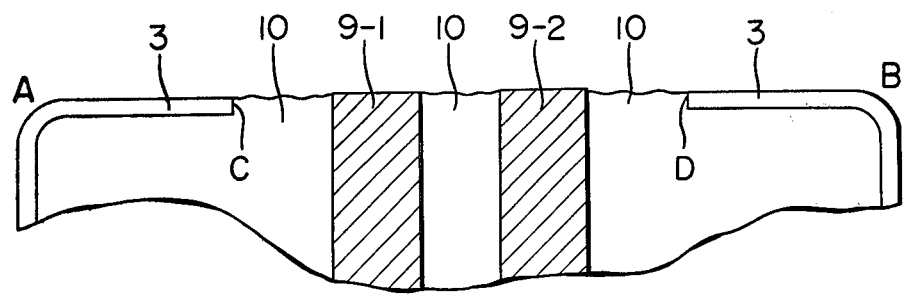
FIG. 6A is a view similar to FIG. 2A but showing the essential portion of the third embodiment.

In the magnetic head shown in FIG. 6A, a stack of four sheets of permalloy each of which is 0.15 mm thick is used to form a magnetic core 9-1, 9-2. The composition of the fixing material used in the magnetic head varied from portion to portion. Thus, at the vicinity of the tape sliding surface, the fixing material 10 is composed of 35% of an epoxy resin, 40% of $CaCO_3$ fine powder and 25% of $MoS_2$ fine powder (precentages are by weight) and at the portion apart from the tape sliding surface there is used a mixture of 40% of the epoxy resin and 60% of $CaCO_3$ fine powder as the fixing material 10.

As mentioned above, $CaCO_3$ fine powder may be used together with $MoS_2$ fine powder as the filler for the fixing material besides various fillers hitherto used. In this case, $CaCO_3$ fine powder advantageously increases the abrasion loss of the resulting fixing material.

Figure 6B:
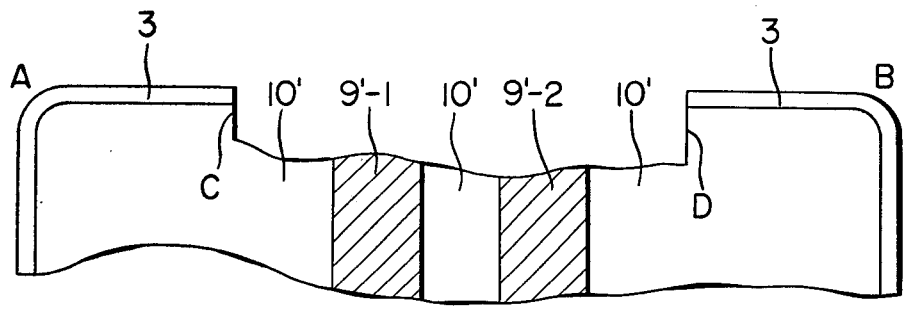
FIG. 6B is a view similar to FIG. 2B but showing the essential portion of the third embodiment.

FIG. 6A shows the profile thereof before conducting an abrasion test and FIG. 6B shows the corresponding profile after the abrasion test. In the abrasion test, a magnetic tape was driven on the tape sliding surface at the running speed of 4.75 cm/sec. for 200 hours. FIG. $6^B$ demonstrates that the magnetic core 9'-1, 9'-2 and the fixing material 10' were almost uniformly abrased by the abrasion test and that of the fixing material 10, 10' is excellent is adhesive property as well as insulating property.

As will be understood from this example, by dispersing the filler in such manner that it has a concentration gradient, it becomes possible to have the core and the fixing material abrased in the same degree without losing any desired property such as stability against the effect of temperature and humidity, injectability, adhesive property and insulating property. Therefore, the tape sliding surface constituted of the core and the fixing material can be abraded uniformly by a running tape and thereby the irregularity of the tape sliding surface caused by such abrasion may be minimized. Since there is produced no spacing-loss, the magnetic head is able to maintain its good electro-magnetic transforming characteristic until the magnetic core reaches its abrasion limit.

While the present invention has been particularly shown and described with reference to preferred embodiments thereof, it will be understood by those skilled in the art that the foregoing and other changes in form and details can be made therein without departing from the spirit and scope of the invention.

What we claim is

1. A magnetic head comprising:
   a magnetic core having a sliding surface on which a magnetic tape moves;
   a casing for enclosing said magnetic core; and
   a fixing material used to secure said magnetic core within said casing, said fixing material comprising not less than 19.5% by weight of a resin having adhesiveness, 40–80% by weight of a fine powder of $SiO_2$ as a filter and 0.5–50% by weight of a fine powder of $MoS_2$ as another filler.

2. A magnetic head according to claim 1, in which the magnetic core is composed of permalloy, and the fixing material contains about 60% by weight of a fine powder of $SiO_2$ and about 10% by weight of a fine powder of $MoS_2$.

3. A magnetic head according to claim 1, in which the magnetic core is composed of sendust, and the fixing material contains about 60% by weight of a fine powder of $SiO_2$ and about 5% by weight of a fine powder of $MoS_2$.

4. A magnetic head according to claim 1, in which the resin having adhesiveness is an epoxy resin.

5. A magnetic head according to claim 4, in which the magnetic core is composed of permalloy, and the fixing material contains about 60% by weight of a fine powder of $SiO_2$ and about 10% by weight of a fine powder of $MoS_2$.

6. A magnetic head according to claim 4, in which the magnetic core is composed of sendust, and the fixing material contains about 60% by weight of a fine powder of $SiO_2$ and about 5% by weight of a fine powder of $MoS_2$.

7. A magnet head comprising:
   a magnetic core having a sliding surface on which a magnetic tape moves;
   a casing for enclosing said magnetic core; and
   a fixing material used to secure said magnetic core within said casing, said fixing material comprising not less than 19.5% by weight of a resin having adhesiveness, 40–80% by weight of a fine powder of $SiO_2$ as a filler and 0.5–50% by weight of a fine powder of $MoS_2$ as another filler, said fixing material being present in the vicinity of the sliding surface.

8. A magnetic head comprising:
   a magnetic core having a sliding surface on which a magnetic tape moves;
   a casing for enclosing said magnetic core; and
   a fixing material used to secure said magnetic core within said casing, said fixing material comprising not less than 19.5% by weight of epoxy resin having adhesiveness, 40–80% by weight of a fine powder of $SiO_2$ as a filler and 0.5–50% by weight of a fine powder of $MoS_2$ as another filler, said fixing material being present in the vicinity of the sliding surface.

9. A magnetic head comprising:
   a magnetic core having a sliding surface on which a magnetic tape moves;
   a casing for enclosing said magnetic core; and a fixing material used to secure said magnetic core within said casing, said fixing material essentially consisting of a resin, a filler and $MoS_2$ added as an additional filler, wherein said fixing material is a mixture of at least 19.5% by weight of an epoxy resin, 40 to 80% by weight of a fine powder of $SiO_2$, and 0.5 to 50% by weight of a fine powder of $MoS_2$.

* * * * *

UNITED STATES PATENT AND TRADEMARK OFFICE
CERTIFICATE OF CORRECTION

PATENT NO. : 4,161,005
DATED : July 10, 1979
INVENTOR(S) : HIROAKI KATO, ET AL

It is certified that error appears in the above-identified patent and that said Letters Patent are hereby corrected as shown below:

Column 1, line 55, change "within" to --with--.

Column 2, line 40, change "undeterioration" to --deterioration--.

Column 5, line 52, change "is" to --in--.

Column 6, line 16, change "filter" to --filler--.

Signed and Sealed this

Thirtieth Day of October 1979

[SEAL]

Attest:

RUTH C. MASON
Attesting Officer

LUTRELLE F. PARKER
Acting Commissioner of Patents and Trademarks